No. 889,362. PATENTED JUNE 2, 1908.
W. O. FOSS.
SPEED CHANGING MECHANISM.
APPLICATION FILED JAN. 21, 1908.

Witnesses:
Laura Berger
Clinton A. Sowers

By his Attorney

Inventor
Walter O. Foss
H. B. Schermerhorn

UNITED STATES PATENT OFFICE.

WALTER O. FOSS, OF PHILADELPHIA, PENNSYLVANIA, ASSIGNOR OF FOUR-FIFTHS TO GEORGE LINK, FREDERICK C. BRUNHOUSE, PHILIP G. LANG, AND RALPH E. BRUNHOUSE, OF PHILADELPHIA, PENNSYLVANIA.

SPEED-CHANGING MECHANISM.

No. 889,362.　　　Specification of Letters Patent.　　　Patented June 2, 1908.

Application filed January 21, 1908. Serial No. 411,947.

*To all whom it may concern:*

Be it known that I, WALTER O. FOSS, a citizen of the United States, residing at Philadelphia, in the county of Philadelphia and State of Pennsylvania, have invented certain new and useful Improvements in Speed-Changing Mechanisms, of which the following is a specification.

My invention relates to speed changing and reversing mechanisms and my object is to provide a device of this character, designed primarily for automobile use, wherein the mechanism for the forward speeds and for the reverse is combined and arranged in a compact, effective and novel manner.

More specifically, my aim is to do away with unnecessary friction and wear of parts by an arrangement confining the rotation and interaction of parts to those alone that are essential to the transmission of the desired forward speed or of the reverse, and allowing all other parts to remain at rest. In my attainment of this end I have likewise secured an increased road-clearance over that ordinarily existing between the transmission mechanism and the roadway beneath.

These objects I accomplish by the means herein described and shown in the accompanying drawings, in which—

Figure 1:
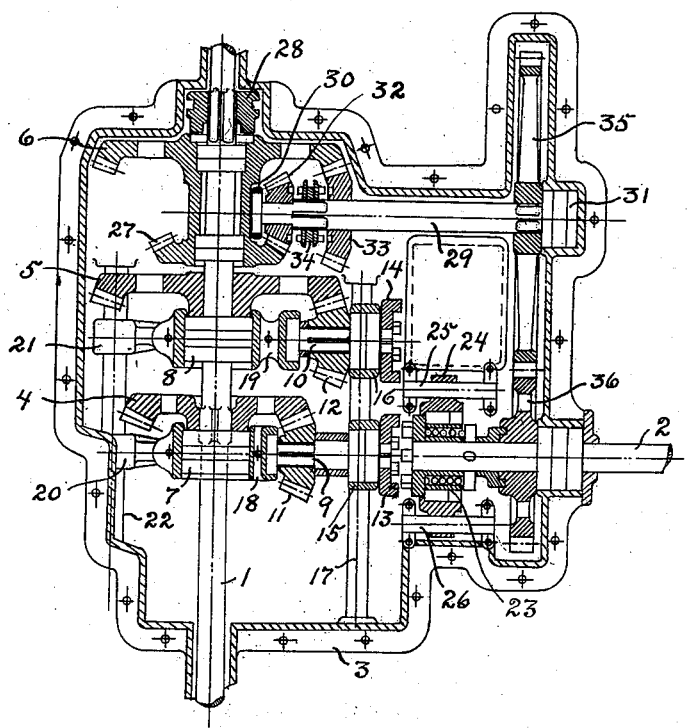
Figure 2:
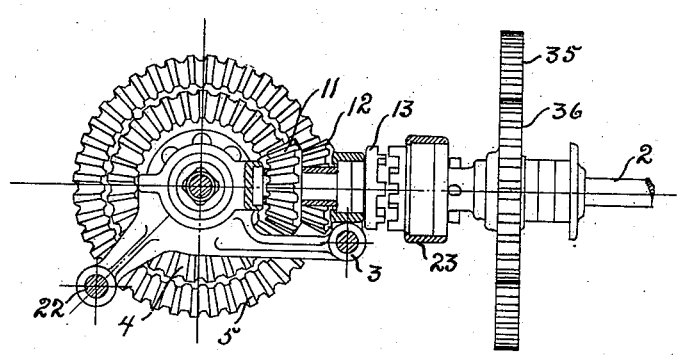

Figure 1 is a view, in horizontal section, of the entire mechanism, with its inclosing gear casing. Fig. 2 is a view, in side elevation, of a portion of the mechanism shown in Fig. 1.

In Fig. 1, 1 is an automobile rear axle, 2 is a power shaft and 3 a gear casing. Upon the axle 1 are mounted the driving disks 4, 5 and 6 representing respectively the high, intermediate and low forward speeds. The driving disks 4 and 5 are provided with the collar bearings 7 and 8 which are rotatable within the brackets 18 and 19. The brackets 18 and 19 carry the inner ends of the squared shafts 9 and 10 upon which the bevel gears 11 and 12 are mounted. The outer enlarged ends of the shafts 9 and 10 are furnished with the clutches 13 and 14, and are rotatably mounted in the bearings 15 and 16 which, in turn, are slidably mounted upon the rod 17. The brackets 18 and 19 are supported on the other side by the short arms 20 and 21 slidably mounted upon the rod 22. It is thus apparent that each of the driving disks 4 and 5 is, together with its bevel gear and clutch, slidably mounted upon the rear axle by means of its bracket and the rods 17 and 22 and is adapted to be slid to and fro thereon by any suitable lever and clutch mechanisms (not shown).

The end of the power shaft 2 is furnished with a double-headed, spring-pressed clutch 23 slidably keyed thereon. The clutch 23 is mounted in the bearing 24 which is slidably supported upon the brackets 25 and 26.

I will now describe the manner in which the high and the intermediate forward speeds are obtained.

The parts being in the positions shown in Fig. 1, the clutch 23 on the end of the power shaft is brought into engagement with clutch 13. This transmits the revolution of the power shaft 2 through the bevel gear 11 to the high speed driving disk 4. It will be observed that the axle 1 is squared at this point so that the rotation of the driving disk is positively transmitted to the axle. During the above described transmission of the high forward speed, all other parts are absolutely at rest.

Should it be desirable to exchange the high for the intermediate forward speed, the clutch 23 is first thrown out of engagement with clutch 13, the high speed transmission mechanism is next slid along the axle 1 and guide rods 17 and 22 into the space provided for the purpose within the gear casing 3. The intermediate speed transmission is then slid over into place upon the squared section of the axle, and clutch 23 is thrown into engagement with clutch 14.

It remains to designate the parts comprising the low forward speed and the reverse and their mode of operation. The low forward speed disk 6 has the reverse gear 27 formed integrally therewith, both gears being freely rotatable upon the rear axle 1 and being rendered positive in their action by the clutch 28 mounted and slidable upon a squared section of the axle. The combined low forward speed disk and reverse gear have no lateral movement upon the axle. The shaft 29, one end of which is mounted in the collar bearing 30 and the other in the bearing 31, is furnished with the bevel gear 32 meshing with reverse gear 27 and bevel gear 33 meshing with the gear on the low forward speed driving disk 6. Bevel gears 32 and 33 run free on the shaft 29 and are rendered positive in their action by the double-faced clutch 34 located between said gears upon a squared section of the shaft. The gear 35 is keyed to the other end of shaft 29 and meshes with gear 36 which runs free on the power shaft 2.

To bring into action the low forward speed, the clutch 23 is thrown off either from the high or intermediate forward speed mechanism and into engagement with gear 36. The clutch 28 being then thrown on, and clutch 34 being thrown into engagement with gear 33, power is transmitted from the power shaft 2 through gears 36 and 35, shaft 29, and gear 33 to the low forward speed driving disk 6 and thence to the rear axle 1. To operate the reverse mechanism, the clutch 34 is thrown into engagement with bevel gear 32, all other parts remaining in the adjustment above described.

What I claim as my invention and desire to secure by Letters Patent is:—

1. A power shaft, an axle, a plurality of interchangeable power transmission mechanisms slidably mounted upon said axle, each mechanism consisting of a driving disk, bevel gear and clutch, and a clutch on said power shaft adapted to engage either of the clutches of said power transmission mechanisms, substantially as described.

2. A power shaft, an axle, a plurality of interchangeable power transmission mechanisms, each mechanism consisting of a driving disk, bevel gear and clutch, guide-rods and brackets adapted to slidably support said power transmission mechanisms upon said axle, said power transmission mechanisms being adapted to slide upon said axle and guide rods into a position opposite the end of said power shaft and a clutch on said power shaft adapted to engage either of the clutches of said power transmission mechanisms when so brought into position, substantially as described.

3. In combination with a power shaft and axle, a high-speed transmission mechanism adjustably mounted upon said axle, an intermediate speed transmission mechanism adjustably mounted upon said axle, means for positively coupling either of said mechanisms to said power shaft, a low-speed transmission mechanism and reverse gear integral therewith mounted free upon said axle, and means for actuating either said low-speed transmission mechanism or said reverse gear from said power shaft, said means consisting of the bevel gears 32 and 33, clutch 34, shaft 29, gears 35 and 36, and clutches 28 and 23, substantially as described.

WALTER O. FOSS.

Witnesses:
LAURA BERGER,
CLINTON A. SOWERS.